(No Model.)
A. C. CREHORE.
INDICATOR FOR ELECTRIC CURRENTS.
No. 548,701. Patented Oct. 29, 1895.
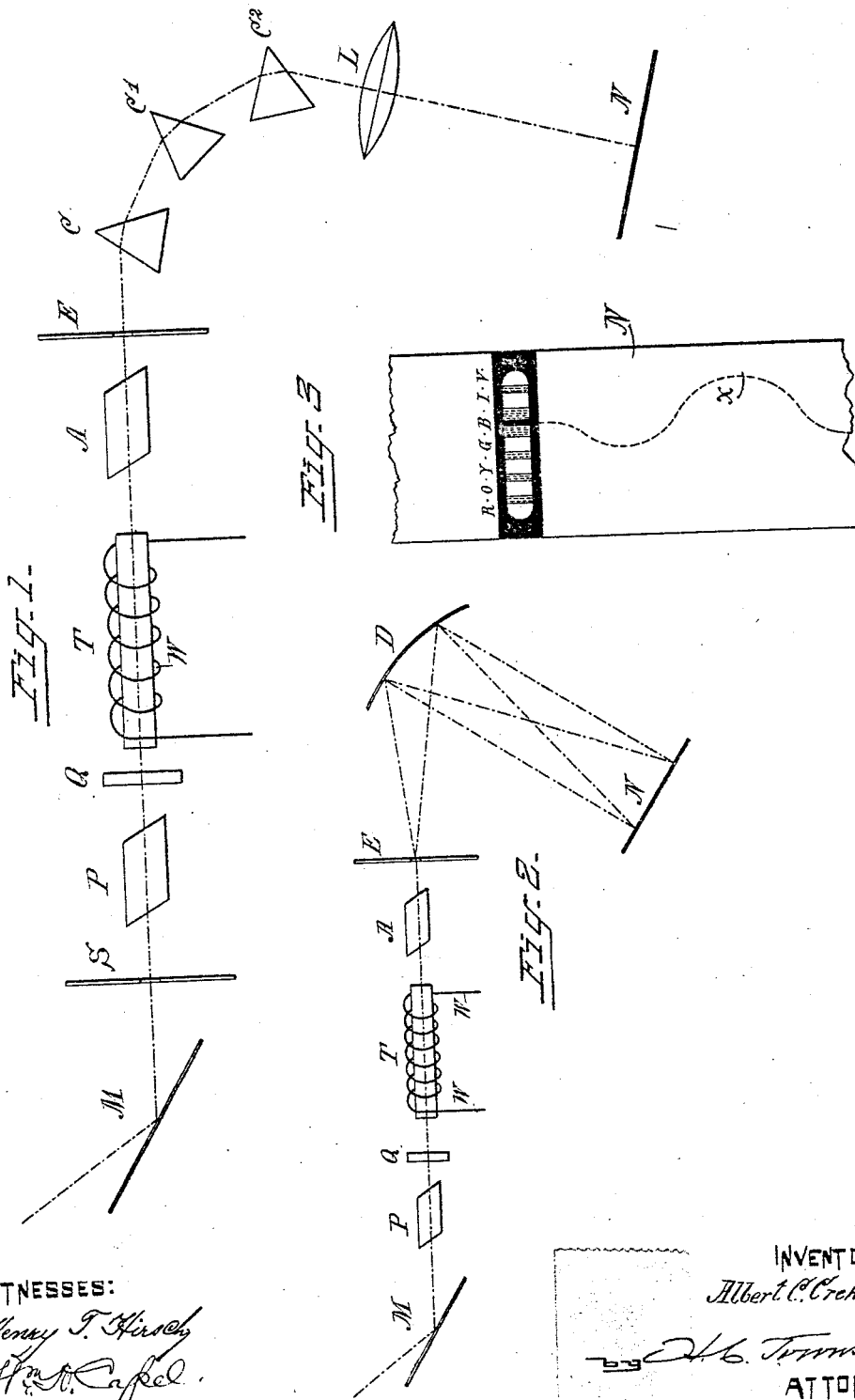
WITNESSES:
INVENTOR:
Albert C. Crehore.
ATTORNEY.

UNITED STATES PATENT OFFICE.

ALBERT CUSHING CREHORE, OF HANOVER, NEW HAMPSHIRE.

INDICATOR FOR ELECTRIC CURRENTS.

SPECIFICATION forming part of Letters Patent No. 548,701, dated October 29, 1895.

Application filed May 25, 1895. Serial No. 550,653. (No model.)

*To all whom it may concern:*

Be it known that I, ALBERT CUSHING CREHORE, a citizen of the United States, and a resident of Hanover, in the county of Grafton and State of New Hampshire, have invented a certain new and useful Method of and Apparatus for Indicating and Recording Electric Currents, of which the following is a specification.

My invention relates to a method of and apparatus for indicating, recording, and measuring electric currents, whatever their character, whether direct, pulsating, or alternating, and whether they are to be considered *per se* or in the capacity of an agent in the transmission of intelligence.

One object of the invention is the production of a system by which the variations and changes in electric currents may be more accurately determined than heretofore.

In means formerly employed for the consideration of the current *per se* an appreciable amount of ponderable matter has been moved back and forth at each change or reversal in the current, as in the Froelich experiments with a telephone wherein the diaphragm carried a mirror and by its vibrations gave angular motion to a beam of light, or as in the use of a wire or a stream of mercury in a magnetic field. In these devices when the variations, changes, or reversals of current are of high frequency the unavoidable difficulty ensues that the forced oscillations of the ponderable vibrator become so superimposed upon those of the current that they are inseparably mixed together and the record does not show the true condition or effect of the current, but the resultant vibrations of the instrument.

Another object is the perfection of a system and apparatus by which voluntary changes made manually or automatically in an electric current may be indicated or recorded independently of the stylus, needle, or armature now used and with a velocity and precision heretofore unknown. Such a system is adapted for use wherever intelligence of any sort is to be transmitted or records of any sort are to be made by makes and breaks or by pulsations or variations in an electric current.

To avoid the difficulties arising from the use of the aforesaid ponderable vibrators, I have conceived of a manner of producing and using a vibrator having no weight. For this weightless vibrator I employ a beam of light, and following the discovery of Faraday I subject it to the influence of the electric current in the manner hereinafter set forth.

My invention consists in a method of measuring or indicating the vibrations or changes in an electric current by rotating through the action of said current the planes of polarization of the component rays in a beam of polarized light passed through an analyzer and resolved into the colors of the spectrum and photographing the variations in said beam on a rapidly-moving sensitized plate, thereby graphically representing the variations in said current.

My invention further consists in the method of indicating or recording variations or changes in an electric current by polarizing and analyzing a beam of light, resolving it into the colors of the spectrum, rotating the plane of polarization of the component rays in said beam by the action of said current, thereby producing a moving dark band in the spectrum, and photographing the variations in the position of said band, thereby producing a record of the variations in the strength of said current.

My invention also consists in the combination of a polarizer, an analyzer set to darkness for one of the component rays of a beam of light, a medium interposed between the polarizer and analyzer for rotating the planes of polarization of the component rays of said beam of light, a portion of an electric circuit located in a position to control the action of said medium, means for resolving the emergent beam into the colors of the spectrum, thereby producing a dark band in place of the occluded ray, and a rapidly-moving photographic plate for recording the variations in position of the dark band.

My invention further consists in the combination and arrangement of parts substantially as hereinafter described, and set forth in the claims.

In the accompanying drawings, forming a part of this specification, Figure 1 diagrammatically represents the apparatus as arranged for carrying out my invention. Fig. 2 represents a modification thereof. Fig. 3 diagrammatically represents the spectrum and the photographic record of the variations therein.

I have illustrated two arrangements of apparatus for carrying out my invention and will describe the operation and result with respect thereto, although it may be carried out by other arrangements of apparatus and by the substitution of various other substances or elements for those constituting the several parts of said apparatus.

The light used may be taken from any intense source of white light, as from the sun or an arc lamp. The apparatus of the illustration is arranged for dealing with sunlight, and M indicates the mirror of a heliostat, from which the beam of light is reflected through an opening in the screen S. In the path of this beam, Fig. 1, are placed a polarizer, as a Nicol prism P, a magnetically-controlled plane rotating and dispersing a medium T, an analyzer, as a Nicol prism A, a series of triangular prisms C C' C² for producing the spectrum, and a lens L. In addition it is preferable to employ a quartz plate, as at Q, which has the property of naturally rotating the planes of polarization of the component rays of a beam of light. The emergent ray may then be allowed to fall upon a screen or upon a photographic plate or film, as at N, where the spectrum is displayed.

It is desirable to use the lens L, though it may be omitted or it may be placed between A and C; also, more or less than the illustrated number of triangular prisms may be used, as found necessary to properly revolve the beam. Instead of the triangular prism a diffraction-grating may be used, as indicated at D in Fig. 2. I have there represented a concave grating, though obviously a plane grating with a lens might be substituted; also, by preference, for further reducing the beam to produce a sharper image upon the screen or photograph, the beam in transit from the analyzer to the spectrum-producing device passes through a suitable slit, as indicated in the screen at E.

The medium used for varying the rotation of the plane of polarization (indicated at T) may consist of a tube sealed at its ends and containing a substance which may or may not naturally rotate the plane of polarization. I may use for this purpose bisulphide of carbon, which has the property of rotating the plane of polarization when in a magnetic field, and only then. Instead of bisulphide of carbon other substances may be used, which without the aid of the magnetic field effect a certain amount of rotation of the plane of polarization and which vary the rotation of said plane under the action of the magnetic field. I prefer, however, to use the bisulphide of carbon and in connection therewith, as indicated at Q, a quartz plate cut perpendicularly to the optic axis. Such a plate naturally rotates the plane of polarization to a greater extent than is usually effected by the bisulphide of carbon in the magnetic field. By combining these two substances I am enabled to produce a clearly-defined band and to maintain it, the quartz acting to produce the band even when there is no current and to retain it within the visual spectrum even when the current falls to zero. The magnetic field is best produced by means of a coil W of insulated wire wrapped around the tube, though it may be produced in other obvious ways. This coil may be placed directly in the circuit or in a shunt thereof, as circumstances dictate. The planes of polarization of the different components or rays of the beam of light are rotated to different definite extents by the quartz, and such rotation is varied by the action of the magnetic field upon the bisulphide of carbon and to an extent exactly corresponding to the variations in the electric current which produces the magnetic field.

Though I prefer to use the quartz plate in combination with the other elements of the apparatus as just described, it is not absolutely essential, and I may dispense with it and rely solely upon the bisulphide of carbon with its magnetic field for rotating the planes of polarization of the component rays of the beam to produce the dark-band index.

The apparatus having been arranged substantially as indicated in either figure and with no current flowing in coil W, the analyzer is rotated about its horizontal axis through such an angle as will cause the disappearance from the spectrum of a color produced by a certain component ray of the beam, preferably one near the violet end—as, for instance, blue—a dark band appearing in its place. The analyzer is then fixed in place and the current turned on, when a greater or less rotation of the plane of polarization is produced, the colors to the right or left of blue being cut out in accord with the increase or diminution of the current. As one color disappears the one last cut out reappears, thus causing the dark band to travel along the spectrum. If, now, it is desired to record the movement of the dark band and so produce a map of the fluctuations of the current, it is only necessary to replace the screen by a rapidly-moving sensitized plate. For instance, if the spectrum is allowed to fall upon a photographic film or plate N, moving rapidly at right angles to the spectrum and to the beam of light, the dark band as it shifts throughout the spectrum will produce a dark path upon the photograph, and for equal fluctuations of the current above and below the normal said path will appear substantially as indicated by the sinuous line $x$.

For any given current the position of the band is always the same, so that its motion may be calibrated by passing different known currents through the coil. A scale having been thus established, any unknown current is easily measured and its variations or fluctuations readily determined.

As clearly seen from the above, the dark band is the index. It has no mass. The movement of the component rays of the beam of light causes the movement of this index. Said rays have no mass. The plane of polarization whose rotation causes the movement of the component rays of the beam of light has no mass, and the rotation of said plane is produced by the imponderable electric current. Therefore I have a massless index vibrating in response to the variations of an electric current.

By operating upon the current manually or automatically, as by any of the various telegraphic or signaling mechanisms, the dark band will be made to shift in a definite manner so as to clearly indicate the effect produced upon the current. Then by the movement of said band upon a screen the intelligence transmitted may be read off, or by allowing the spectrum to fall upon a moving photographic plate the indication or message may be recorded.

What I claim as my invention is—

1. The method of recording the variations in an electric current consisting in polarizing a beam of light, resolving it into the colors of the spectrum, producing a dark band in the spectrum, rotating the plane of polarization by the action of said current, and photographing successively the variations in position of said band thereby producing a sinuous curve showing the variations in the strength of the current.

2. The herein described method of measuring or indicating an electric current consisting in producing a beam of polarized light in which the planes of polarization of the component rays are rotated to different extents, resolving the beam of light into the colors of the spectrum, having first passed the same through an analyzer to produce a dark band in said spectrum, rotating the planes of polarization of the component rays of the beam by the electric current, and automatically producing a graphic representation of the various positions of said band, as and for the purpose described.

3. In an apparatus for indicating the variations of an electric current, a polarizer, an analyzer set to darkness for but one of the component rays of a beam of light, means for resolving the emergent beam into the respective remaining colors of the spectrum thereby showing a dark band in place of the occluded ray, a medium interposed between the polarizer and analyzer for rotating the plane of polarization, a portion of the circuit whose current is to be observed being placed about said medium, and a rapidly moving photographic plate for producing a record of the variations in position of said dark band, as and for the purpose set forth.

Signed at Hanover, in the county of Grafton and State of New Hampshire, this 23d day of May, A. D. 1895.

ALBERT CUSHING CREHORE.

Witnesses:
N. A. FROST,
E. M. CARTER.